(12) United States Patent
Sudo et al.

(10) Patent No.: US 8,739,573 B2
(45) Date of Patent: Jun. 3, 2014

(54) APPARATUS AND METHOD FOR MANUFACTURING VITREOUS SILICA CRUCIBLE

(75) Inventors: Toshiaki Sudo, Akita (JP); Eriko Suzuki, Akita (JP); Hiroshi Kishi, Akita (JP); Takeshi Fujita, Akita (JP)

(73) Assignee: Japan Super Quartz Corporation, Akita-Shi (JP)

( * ) Notice: Subject to any disclaimer, the term of this patent is extended or adjusted under 35 U.S.C. 154(b) by 0 days.

(21) Appl. No.: 13/389,392

(22) PCT Filed: Aug. 9, 2010

(86) PCT No.: PCT/JP2010/063455
§ 371 (c)(1),
(2), (4) Date: Feb. 7, 2012

(87) PCT Pub. No.: WO2011/019012
PCT Pub. Date: Feb. 17, 2011

(65) Prior Publication Data
US 2012/0131954 A1  May 31, 2012

(30) Foreign Application Priority Data
Aug. 12, 2009  (JP) ................ 2009-187333

(51) Int. Cl.
*C25B 11/12* (2006.01)
*C03B 19/09* (2006.01)
*C25B 11/04* (2006.01)
*C04B 35/52* (2006.01)

(52) U.S. Cl.
CPC ............. *C25B 11/12* (2013.01); *C25B 11/0405* (2013.01); *C04B 35/52* (2013.01); *C03B 19/09* (2013.01)

USPC ............... 65/144; 65/17.3; 314/60; 445/67

(58) Field of Classification Search
CPC .... C25B 11/12; C25B 11/0405; C04B 35/25; C03B 19/09
USPC .......................... 65/17.3–17.6, 144
See application file for complete search history.

(56) References Cited

U.S. PATENT DOCUMENTS 2,957,101 A * 10/1960 Barkley ................. 314/129
3,251,926 A *  5/1966 Click et al. .............. 174/94 R
(Continued)

FOREIGN PATENT DOCUMENTS

JP   56078812 A * 6/1981 ............ G02B 7/26
JP   01-148718 A  6/1989
(Continued)

OTHER PUBLICATIONS

International Search Report for PCT/JP2010/063455; mail date Sep. 7, 2010.

*Primary Examiner* — Jodi C Franklin
(74) *Attorney, Agent, or Firm* — Pearne & Gordon LLP

(57) ABSTRACT

There are provided an apparatus and a method for manufacturing a vitreous silica crucible which can prevent the deterioration of the inner surface property in the manufacturing process of a vitreous silica crucible. The apparatus includes a mold defining an outer shape of a vitreous silica crucible, and an arc discharge unit having electrodes and a power-supply unit, wherein each of the electrodes includes a tip end directed to the mold, the other end opposite to the tip end, and a bent portion provided between the tip end and the other end.

11 Claims, 7 Drawing Sheets

(56) References Cited

U.S. PATENT DOCUMENTS

| | | | |
|---|---|---|---|
| 3,824,088 A * | 7/1974 | Bryan et al. | 65/40 |
| 4,002,942 A * | 1/1977 | Gaboury | 314/60 |
| 4,208,149 A * | 6/1980 | Bowman | 403/267 |
| 4,243,833 A * | 1/1981 | Suga | 373/92 |
| 4,351,056 A * | 9/1982 | Kiikka et al. | 373/88 |
| 4,373,127 A * | 2/1983 | Haskett et al. | 219/69.15 |
| 4,433,266 A * | 2/1984 | Riehl | 313/135 |
| 4,935,046 A * | 6/1990 | Uchikawa et al. | 65/17.4 |
| 5,174,801 A | 12/1992 | Matsumura et al. | |
| 5,723,232 A * | 3/1998 | Yamada et al. | 429/245 |
| 5,978,410 A * | 11/1999 | Johansen et al. | 373/89 |
| 6,363,098 B1 * | 3/2002 | Hagihara et al. | 373/88 |
| 8,240,169 B2 * | 8/2012 | Fukui et al. | 65/144 |
| 2003/0210731 A1 * | 11/2003 | Fukui et al. | 373/88 |
| 2005/0236373 A1 * | 10/2005 | Hidaka | 219/119 |
| 2006/0291525 A1 * | 12/2006 | Montminy et al. | 373/92 |
| 2009/0084308 A1 * | 4/2009 | Kishi et al. | 117/13 |
| 2009/0145351 A1 * | 6/2009 | Kishi et al. | 117/208 |
| 2009/0165700 A1 * | 7/2009 | Kishi et al. | 117/13 |
| 2010/0077611 A1 * | 4/2010 | Fujita et al. | 29/874 |
| 2010/0178855 A1 * | 7/2010 | Fukui et al. | 451/180 |
| 2010/0244311 A1 * | 9/2010 | Kishi et al. | 264/219 |
| 2011/0214454 A1 * | 9/2011 | Fujita et al. | 65/33.1 |
| 2011/0298367 A1 * | 12/2011 | Boroczki et al. | 313/634 |
| 2012/0131954 A1 * | 5/2012 | Sudo et al. | 65/17.3 |
| 2012/0137733 A1 * | 6/2012 | Sudo et al. | 65/17.4 |
| 2012/0141622 A1 * | 6/2012 | Sudo et al. | 425/174.6 |

FOREIGN PATENT DOCUMENTS

| | | | |
|---|---|---|---|
| JP | 05-105577 A | | 4/1993 |
| JP | 08-169798 A | | 7/1996 |
| JP | 2002-154894 A | | 5/2002 |
| JP | 2007250343 A | * | 9/2007 |
| JP | 2007273206 A | * | 10/2007 |
| WO | 2009069773 A1 | | 6/2009 |

* cited by examiner

APPARATUS AND METHOD FOR MANUFACTURING VITREOUS SILICA CRUCIBLE

TECHNICAL FIELD

The present invention relates to an apparatus and a method for manufacturing a vitreous silica crucible, and in particular, relates to a technique suitable for controlling an inner surface property in manufacturing a vitreous silica crucible used for pulling a silicon single crystal.

BACKGROUND ART

In general, a silicon single crystal has been manufactured by the Czochralski method (the CZ method) using a vitreous silica crucible. Silicon melt obtained by melting polycrystalline silicon raw material is retained in the vitreous silica crucible, and a seed crystal of a silicon single crystal is dipped into the silicon melt and the seed crystal is gradually pulled while rotating the seed crystal. The seed crystal acts as a core to grow a silicon single crystal.

Such a vitreous silica crucible has two-layer structure having an outer layer containing a number of bubbles, and a transparent inner layer. The property of the surface of the inner layer, that is, the inner surface contacting silicon melt during pulling a single crystal affects the property of an obtained silicon single crystal, and thus affects the yield of silicon wafers, which are the final product. Thus, conventionally, the inner layer is made of synthetic vitreous silica formed by amorphous synthetic silica powder, and the outer layer is made of natural vitreous silica.

Conventionally, in melting silicon and pulling a single crystal, there has frequently occurred a problem of melt surface vibration. According to this problem, dipping a seed crystal is disturbed by a wave generated on a liquid surface of silicon melt, and thus pulling of a silicon single crystal is prevented or single crystallization is deteriorated. This melt surface vibration phenomenon has become more likely to occur along with increase in diameter of a silicon crystal, the demand to improve the inner surface property of a vitreous silica crucible has become stronger.

The vitreous silica crucible used for the above-mentioned CZ method can be obtained by the processes of depositing silica powder inside a mold to form a silica powder layer, and fusing the silica powder layer by arc discharge, followed by cooling and solidifying. In such a method of manufacturing a vitreous silica crucible, when the silica powder layer is fused, the inner surface is cleaned by so-called fire polishing which is a process of performing arc discharge toward the inner surface of the silica powder layer. The fire polishing is a process of removing, by arc, bubbles generated in the fused material while forming a silica powder layer by fusing silica powder by arc discharge. It is possible to manufacturing a vitreous silica crucible having a good inner surface property by performing such fire polishing treatment.

However, when a vitreous silica crucible is manufactured by use of conventional linear electrodes, for example, as shown in FIG. 8, it is difficult to apply the arc from the electrodes 113 toward the whole area of the sidewall inner surface 111b of the silica powder layer 111. In this case, bubbles are uniformly removed on the bottom inner surface 111a by fire polishing. However, bubbles are not effectively removed on some part of the sidewall inner surface 111b.

In this occasion, for example, arc discharge from linear electrodes 113 is directly applied toward the bottom inner surface 111a, and the silica powder layer 111 is effectively fused on this portion. However, when the conventional electrodes as shown in FIG. 8 are used, arc is difficult to be applied to the sidewall inner surface 111b and a curved surface, and radiation heat is also difficult to be applied thereto. Therefore, on some portion of the sidewall inner surface of a manufactured vitreous silica crucible, bubbles generated in the fusing material are solidified and appear on the surface. This deteriorates the inner surface property.

Then, when a silicon single crystal is pulled by above-mentioned CZ method by use of a vitreous silica crucible having property defects on the sidewall inner surface, single crystallization is prevented on the defects in the crucible, and this leads to decrease in the yield.

Furthermore, nowadays, in order to obtain a large-diameter wafer having a diameter of 762 to 1016 mm (30 to 40 inches), there has been a demand of increase of the diameter of a silicon single crystal, and this requires the size increase of the vitreous silica crucible. For this reason, when a vitreous silica crucible is manufactured, the amount of power necessary for fusing a silica powder layer increases, and thus the power applied to the electrodes is required to increase. In addition, it is required to uniformly apply arc discharged from the electrodes to the whole area of the inner surface of a silica powder layer having a large area. However, as the size of the vitreous silica crucible increases, the surface area of the crucible inside increases. Thus, it becomes more difficult to uniformly apply arc toward the entire inner surface of the sidewall. Then, the above-mentioned bubble removal by fire polishing becomes incomplete, and thus the inner surface property of the manufactured vitreous silica crucible substantially deteriorates. Then, when a silicon single crystal is pulled by use of a vitreous silica crucible having defects in the inner surface property, there can occur a problem in the growth of a silicon single crystal.

In order to avoid generation of property defects in the inner surface in the manufacturing process of a vitreous silica crucible, there is known a technique to remove impurities or the like generated in an apparatus by removing silica fume generated from fused silica powder material as in the technique described in, for example, Patent Document 1.

Furthermore, in order to further improve the inner surface property of a vitreous silica crucible, it has been proposed a method of using amorphous synthetic silica powder as silica powder to form the inner surface of the vitreous silica crucible as in the techniques of Patent Documents 2 and 3.

PRIOR ART REFERENCE

Patent Document

Patent Document 1: JP-A-2002-154894
Patent Document 2: Japanese Patent No. 2811290
Patent Document 3: Japanese Patent No. 2933404

SUMMARY OF THE INVENTION

Problems to be Solved by the Inventions

However, there still has remained a problem that it is difficult to certainly remove bubbles or the like generated in the fusing material on the sidewall inner surface of the silica powder layer, and thus the property of the sidewall inner surface of the manufactured vitreous silica crucible partially deteriorates according to the technique in any of the above-mentioned Patent Documents 1 to 3. Therefore, there has been a problem that there can occur a problem in growth of a silicon single crystal when the silicon single crystal is manufactured by use of a vitreous silica crucible obtained by the technique described in Patent Documents 1 to 3.

The present invention has been made in view of the above-mentioned problems, and provides an apparatus and a method for manufacturing a vitreous silica crucible which realizes the following purposes.
1. To certainly remove bubbles or the like generated in the fusing material of the vitreous silica crucible during manufacturing in the manufacturing process of the vitreous silica crucible
2. To certainly remove bubbles or the like generated, in particular, in the sidewall inner surface of the fused silica powder layer.
3. To prevent deterioration of the property of the entire inner surface of the vitreous silica crucible, and improve the property.
4. To enable stable quality control by reducing variation of the product property.

Means for Solving the Problems

The apparatus for manufacturing a vitreous silica crucible according to the present invention has solved the above-mentioned problem by comprising a mold defining an outer shape of a vitreous silica crucible, and an arc discharge unit having electrodes and a power-supply unit, wherein each of the electrodes includes a tip end directed to the mold, the other end opposite to the tip end, and a bent portion provided between the tip end and the other end.

It is preferred that an angle between an axis line at the tip end and an axis line at the other end is 90 to 175 degrees, and it is more preferred that the angle is 90 to 150 degrees.

The bent portion may be configured to have a vertex with a sharp bent.

Furthermore, in the present invention, the other ends of the electrodes may be configured to form a substantially polygonal shape.

Furthermore, it is more preferred that the present invention further comprises a position displacement control unit for enabling displacement of at least one of the relative position state of the mold and the electrodes, the position state of the mold, and the position state of the electrodes.

Furthermore, in the present invention, it is more preferred that the position displacement control unit performs at least one position displacement control among the horizontal direction movement, tilt, rotation or pivot of the mold, or the movement of the vertical relative position between the electrodes and the mold.

The method for manufacturing a vitreous silica crucible of the present invention is a method of manufacturing a vitreous silica crucible by use of the above-mentioned apparatus of the present invention, and has solved the above-mentioned problem by including: a silica powder supplying process for supplying silica powder inside the mold to form a silica powder layer, and an arc fusing process for fusing the silica powder layer by arc discharge generated by the electrodes, wherein, in the arc fusing process, the silica powder layer is fused by performing arc discharge toward the silica powder layer from respective tip ends of the electrodes.

In the arc fusing process of the present invention, it is more preferred that the silica powder layer supplied in the mold is fused while displacing at least one of the relative position state of the mold and the electrodes, the position state of the mold, and the position state of the electrodes.

Furthermore, in the fusing process of the present invention, it is more preferred that at least one position displacement control among the horizontal direction movement, tilt, rotation or pivot of the mold, or the movement of the vertical relative position between the electrodes and the mold is performed.

In a conventional apparatus for manufacturing a vitreous silica crucible, the electrodes are linear, and thus it was not possible to move the tip ends of the electrodes sufficiently close to the sidewall inner surface of the silica powder layer. There is high temperature portion around the tip ends of the electrodes, and the bubble removal efficiency (the efficiency of removing bubbles or the like generated in the fusing material) is improved by moving the high temperature portion close to the sidewall inner surface. However, in the conventional technique, it was not possible to move the tip ends of the electrodes sufficiently close to the sidewall inner surface, and thus the bubble removal efficiency was low.

According to the apparatus for manufacturing a vitreous silica crucible of the present invention, the electrode has a bent portion, and thus it is possible to move the high temperature portion at the tip ends of the electrodes sufficiently close to the sidewall inner surface of the silica powder layer, and thus the bubble removal efficiency is improved. Therefore, according to the present invention, it is possible to manufacture a vitreous silica crucible having a good inner surface property, in particular, on the sidewall.

Here, the inner surface property of a vitreous silica crucible mentioned in present invention means any factors affecting properties of a semiconductor single crystal pulled from a vitreous silica crucible. It especially means a property on a crucible inner surface side which contacts silicon melt at the beginning of pulling or is exposed to silicon melt after a certain amount of corrosion during pulling, and means a crucible property affecting strength of a crucible subjected to high temperature for a long time. Specifically, inner surface properties of a vitreous silica crucible means, for example, a bubble density, a bubble size, and an impurity concentration, a surface irregularity of a crucible inner surface shape, a vitrification state, an OH group content as a distribution state (uniformity, ununiformity) along a thickness direction or along an inner surface of a vitreous silica crucible. Furthermore, inner surface properties of a vitreous silica crucible can mean factors affecting properties of a semiconductor single crystal pulled from a vitreous silica crucible, such as a bubble distribution and a bubble size distribution in a crucible thickness direction, an impurity distribution in a region near a crucible inner surface, a surface irregularity, a vitrification state, an OH group content, and a distribution state such as ununiformity in a crucible height direction of these factors.

According to the method of manufacturing a vitreous silica crucible of the present invention, the bubble removal efficiency is improved because of the reasons mentioned above, by moving the tip ends of the electrodes toward the sidewall inner surface of the fused silica powder layer. Therefore, according to the present invention, it is possible to manufacturing a vitreous silica crucible having a good inner surface property, in particular, on the sidewall.

In the arc fusing process of the present invention, the silica powder layer supplied in the mold is fused while displacing at least one of the relative position state of the mold and the electrodes, the position state of the mold, and the position state of the electrodes, and thus the sidewall inner surface of the silica powder layer is subjected to arc discharge more uniformly, and thus the bubbles or the like generated in the fusing material can be removed more certainly by fire polishing.

Furthermore, in the arc fusing process of the present invention, at least one position displacement control among the horizontal direction movement, tilt, rotation or pivot of the mold, or the movement of the vertical relative position between the electrodes and the mold is performed, and thus the bubbles or the like generated in the fusing material can be removed more certainly by fire polishing, as mentioned above.

As silica powder, synthetic silica powder is primarily used for the inner surface layer and natural silica powder is primarily used for the outer surface layer. Here, synthetic silica powder means powder made of synthetic silica, and a chemically synthesized and manufactured material. Synthetic silica powder is amorphous. Because raw material of synthetic silica is gas or liquid, it can be easily purified, and thus synthetic silica powder can be more highly-pure than natural silica powder. Raw material of synthetic silica may be gaseous raw material such as carbon tetrachloride, or may be liquid raw material such as silicon alkoxide. In synthetic vitreous silica, the amount of any impurity can be made 0.1 ppm or less.

Synthetic silica powder made by the sol-gel method usually includes 50 to 100 ppm of residual silanol. Synthetic silica powder made by carbon tetrachloride as raw material can control the amount of silanol in a broad range of 0 to 1000 ppm, and usually includes chlorine in a concentration of approximately 100 ppm or more. When alkoxide is used as raw material, synthetic vitreous silica not including chlorine can be easily obtained. Synthetic silica powder made by the sol-gel method includes silanol in a concentration of 50 to 100 ppm before fusing as mentioned above. When the powder is vacuum-fused, silanol is removed and the amount of silanol in the obtained synthetic vitreous silica is reduced to approximately 5 to 30 ppm. It should be noted that the amount of silanol changes depending on fusing conditions such as fusing temperature, elevated temperature etc. Natural vitreous silica obtained by fusing natural silica powder in the same conditions includes silanol in a concentration of less than 5 ppm.

In general, synthetic vitreous silica is said to have lower high-temperature viscosity than natural vitreous silica obtained by fusing natural silica powder. One of the reasons for the lower high-temperature viscosity is that silanol or halogen destroys a network structure of $SiO_4$ tetrahedron. Synthetic vitreous silica has high light transmissibility for ultraviolet with a wavelength of approximately 200 nm or less. This synthetic vitreous silica has similar property to synthetic vitreous silica made of carbon tetrachloride as raw material and used for ultraviolet optics. Unlike natural vitreous silica, when synthetic vitreous silica is excited by ultraviolet light with a wavelength of 245 nm, fluorescence peaks are not observed in the obtained fluorescence spectrum.

Furthermore, natural silica powder means powder made of natural silica. Natural silica means a material obtained by the steps of digging out naturally-existing quartz raw stones followed by crushing and purification etc. Natural silica powder is made of α-quartz crystal. Natural silica powder contains Al and Ti in a concentration of 1 ppm or more. Natural silica powder contains other metal impurities in a higher concentration than synthetic silica powder. Natural silica powder barely contains silanol. The amount of silanol of natural vitreous silica obtained by fusing natural silica powder is less than 50 ppm. When light transmissibility of natural vitreous silica is measured, light transmissibility rapidly decreases as the wavelength becomes shorter than 250 nm and light transmissibility is very small for light with a wavelength of 200 nm. This is mainly because of Ti contained in a concentration of about 1 ppm as impurities. An absorption peak is observed at around 245 nm. This peak is assigned to oxygen deficiency defects.

When natural vitreous silica is excited by ultraviolet light with a wavelength of 245 nm, fluorescence peaks at wavelengths of 280 nm and 390 nm are observed. These peaks are assigned to oxygen defects in the vitreous silica. Whether vitreous silica is natural or synthetic may be determined by measuring either impurities concentrations, the amount of silanol, light transmissibility, or a fluorescence spectrum obtained by exciting the vitreous silica with ultraviolet light with a wavelength of 245 nm.

In the present invention, silica powder is used as raw material. Silica powder may be either synthetic silica powder or natural silica powder. Natural silica powder may be quartz powder, or powder of a well-known raw material for a vitreous silica crucible such as quartz crystal, quartz sand etc. Furthermore, silica powder may be crystalline, amorphous, or vitreous.

The vitreous silica crucible manufactured by the method of manufacturing a vitreous silica crucible of the present invention has a bowl shape having an opening on the top in order to retain silicon melt therein, and has a substantially cylindrical sidewall, and a curved portion (or a corner portion) connected to the bottom of the sidewall, and a bottom portion connected to the curved portion and closing the crucible bottom. The inner surface of the vitreous silica crucible is classified into three zones of a bottom portion, a wall portion, and a curved portion. The curved portion is, for example, a portion smoothly connecting the cylindrical wall portion and the bottom portion having a constant curvature. In other words, the curved portion is a portion from the point where the constant curvature at the bottom portion starts to change to the point where the curvature matches that of the wall portion (which is infinite when the wall portion is cylindrical).

Effect of the Invention

According to the present invention, arc discharge is performed toward a silica powder layer formed on an inner surface of a mold, from respective tip ends of the electrodes each having a bent portion, and thus the arc discharge is performed in a state that the tip ends of the electrodes are placed close to the sidewall inner surface of the silica powder layer. According to this configuration, the tip ends having relatively high temperature are placed close to the sidewall inner surface, and thus the bubble removal efficiency by fire polishing is improved, and it becomes possible to manufacturing a vitreous silica crucible having a good inner surface property, in particular, on the sidewall In addition, when a silicon single crystal is pulled by use of a vitreous silica crucible obtained by the present invention to manufacturing a silicon single crystal ingot, it is possible to suppress crystal defects and obtain a silicon single crystal which is excellent in the crystallinity.

DESCRIPTION OF THE PREFERRED EMBODIMENTS

Hereinafter, there will be explained in detail an embodiment of an apparatus and a method for manufacturing a vitreous silica crucible according to the present invention, with reference to drawings.

Figure 1:
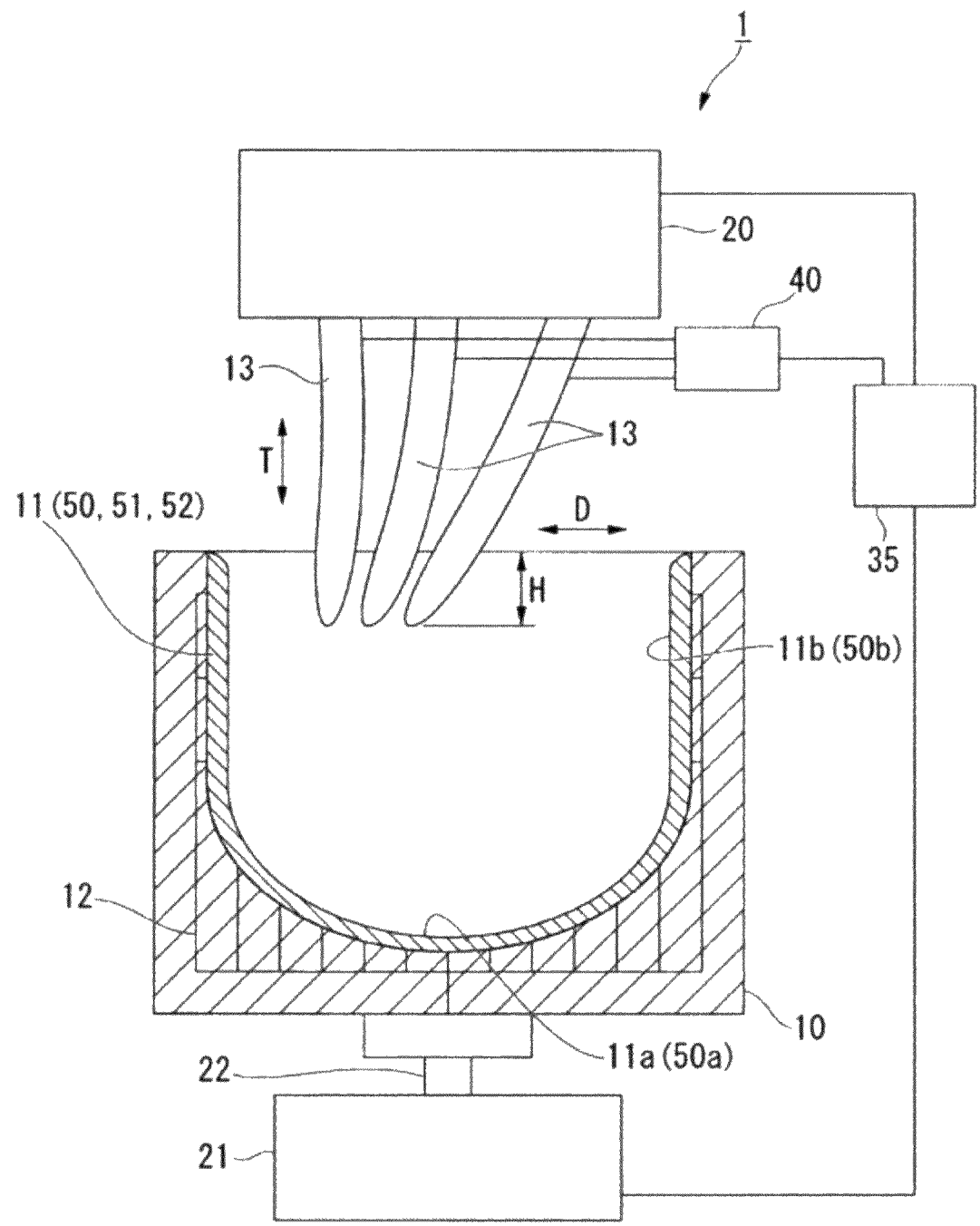
FIG. 1 is a front view for explaining an embodiment of an apparatus for manufacturing a vitreous silica crucible of the present invention.

FIG. 1 is a front sectional view illustrating an apparatus 1 for manufacturing a vitreous silica crucible according to the present embodiment. In the drawings referenced in the following explanation, sizes, thicknesses, and dimensions of various components in the drawings may be different from actual relationship in dimension.

A vitreous silica crucible 50 obtained by the apparatus 1 and the manufacturing method of the present invention is used for pulling a silicon single crystal. Polycrystalline silicon raw material is charged into the vitreous silica crucible 50, the raw material is melted to form silicon melt, a seed crystal is dipped into the silicon melt and the seed crystal is gradually pulled up while rotating the seed crystal. The seed crystal acts as a crystal core to grow a silicon single crystal.

Apparatus for Manufacturing Vitreous Silica Crucible 1-1. General Configuration

As shown in FIG. 1, the apparatus 1 includes a mold 10 which is rotatable by a rotation unit (not shown) and defines an outer shape of a vitreous silica crucible. Silica powder is supplied into the mold 10 and deposited on the inner surface of the mold 10 to form a silica powder layer 11. The mold 10 includes ventilation holes 12 which are open to the inner surface of the mold 10. The ventilation holes 12 are connected to a pressure-reducing unit (not shown) so that the inside of the mold 10 on which the silica powder layer 11 is formed can be depressurized. Carbon electrodes 13 connected to a power-supply unit 40 is provided above the mold 10, and can be used for heating the silica powder layer 11. The carbon electrodes 13 and the power-supply unit 40 for supplying power thereto constitute an arc discharge unit.

The apparatus 1 is a high-output apparatus which can heat and fuse a nonconductive material (silica powder) by arc discharge generated by the carbon electrodes 13 with an output range of 300 kVA to 12,000 kVA. Power supplied to the carbon electrodes 13 from the power-supply unit 40 is controllable by a below-mentioned position displacement control unit 35.

1-2. Carbon Electrode 13

Figure 2:
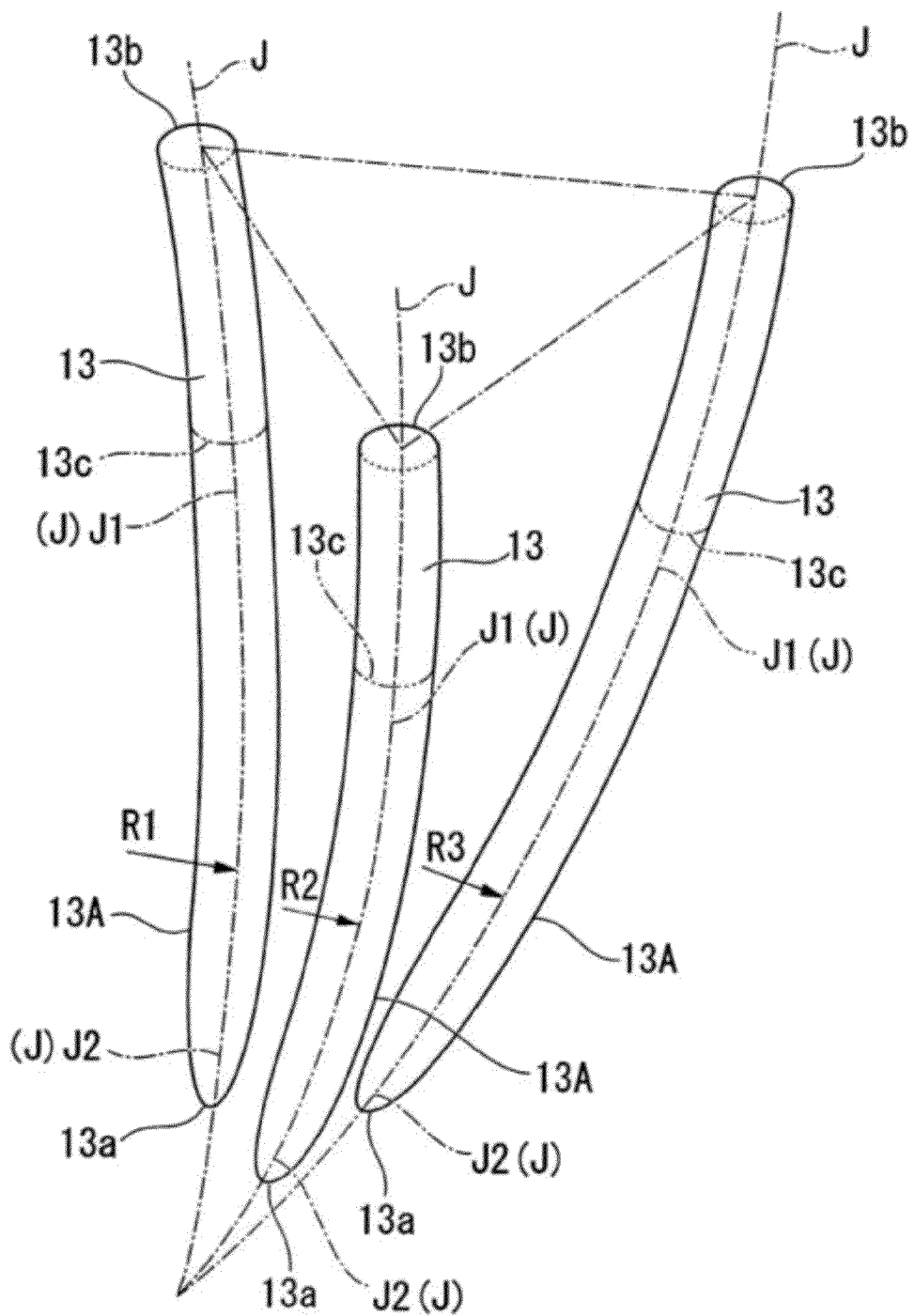
FIG. 2 is a perspective view illustrating a detailed configuration of the carbon electrodes of FIG. 1.

Next, by use of FIG. 2, the carbon electrode 13 will be explained. FIG. 2 is a perspective view illustrating the detail of the carbon electrode 13.

Each of the carbon electrodes 13 has a tip end 13a, and the other end 13b which is an end on the opposite side of the tip end 13a. The tip end 13a is directed to the mold 10. A bent portion 13A is provided between the tip end 13a and the other end 13b. The bent portion 13A may be a curved portion having a relatively large curvature (See FIG. 2), or a vertex 13d with a sharp bent (See FIG. 3). As the carbon electrode 13 has a bent portion 13A, the axis line J1 at the other end 13b and the axis line J2 at the tip end 13a do not overlap. The angle between the axis line J1 and axis line J2 is, for example, 90 to 175 degrees. The angle may be 90, 100, 110, 120, 130, 140, 150, 160, 170, 175 degrees, and it can be in the range between two values of the values exemplified here.

A base portion 13c is on the side, of the bent portion 13A, closer to the other end 13b. An axis line at the base portion 13c and the axis line at the other end 13b coincide, and either of them is an axis line J1. The length of the bent portion 13A between the base portion 13c and the tip end 13a is, for example, 100 to 1100 mm. The length is, for example, 100, 200, 300, 400, 500, 600, 700, 800, 900, 1000, 1100 mm, and it can be in the range between two values of the values exemplified here.

The carbon electrode 13 has a bent portion 13A, and thus the tip end 13a of the carbon electrode 13 is diverted from the center of the mold 10, and directed to the sidewall inner surface of the mold 10. Therefore, the tip ends 13a of the electrodes 13a are configured to be able to uniformly heat not only the bottom inner surface 11a which is placed below, but also the sidewall inner surface 11b when the silica powder layer 11 in the mold 10 is heated and fused by arc discharge.

That is, the apparatus 1 can uniformly heat the silica powder layer 11 from the bottom inner surface 11a to the sidewall inner surface 11b. Furthermore, the temperature of the tip ends 13a of the electrodes 13 is relatively high, and, in the present embodiment, these tip ends 13a can be placed sufficiently close to the sidewall inner surface 11b, and thus it is possible to effectively remove, by fire polishing, bubbles or the like generated during arc fusing the silica powder layer.

When the carbon electrode 13 having a bent portion 13A is consumed by repetition of arc discharge, the angle between the base portion 13c and the tip end 13a decreases, and the carbon electrode 13 becomes more linear. When the carbon electrode is consumed by arc discharge, for example, when the angle between the axis line at the base portion and the axis line at the tip end becomes out of a range specified in the present embodiment, the carbon electrode may be replaced.

Furthermore, in the present embodiment, for example, the bent portion 13A may be configured to be removable from the base portion 13c. In this case, only the bent portion 13A may be replaced because the portion is in particular heavily consumed. When such configuration is employed, time for replacement, running cost, manufacturing cost, or the like can be substantially reduced.

The carbon electrodes 13 are carbon-electrode rods with the same shape to generate arc discharge of, for example, alternate current three-phase (R phase, S phase, T phase). Each of the carbon electrodes 13 has a bent portion 13A between the base portion 13c and the tip end 13a which has a predetermined radius of curvature (R1, R2, and R3). It is preferred that the bent portion 13A has a radius of curvature of 450 to 1500 mm.

Figure 3:
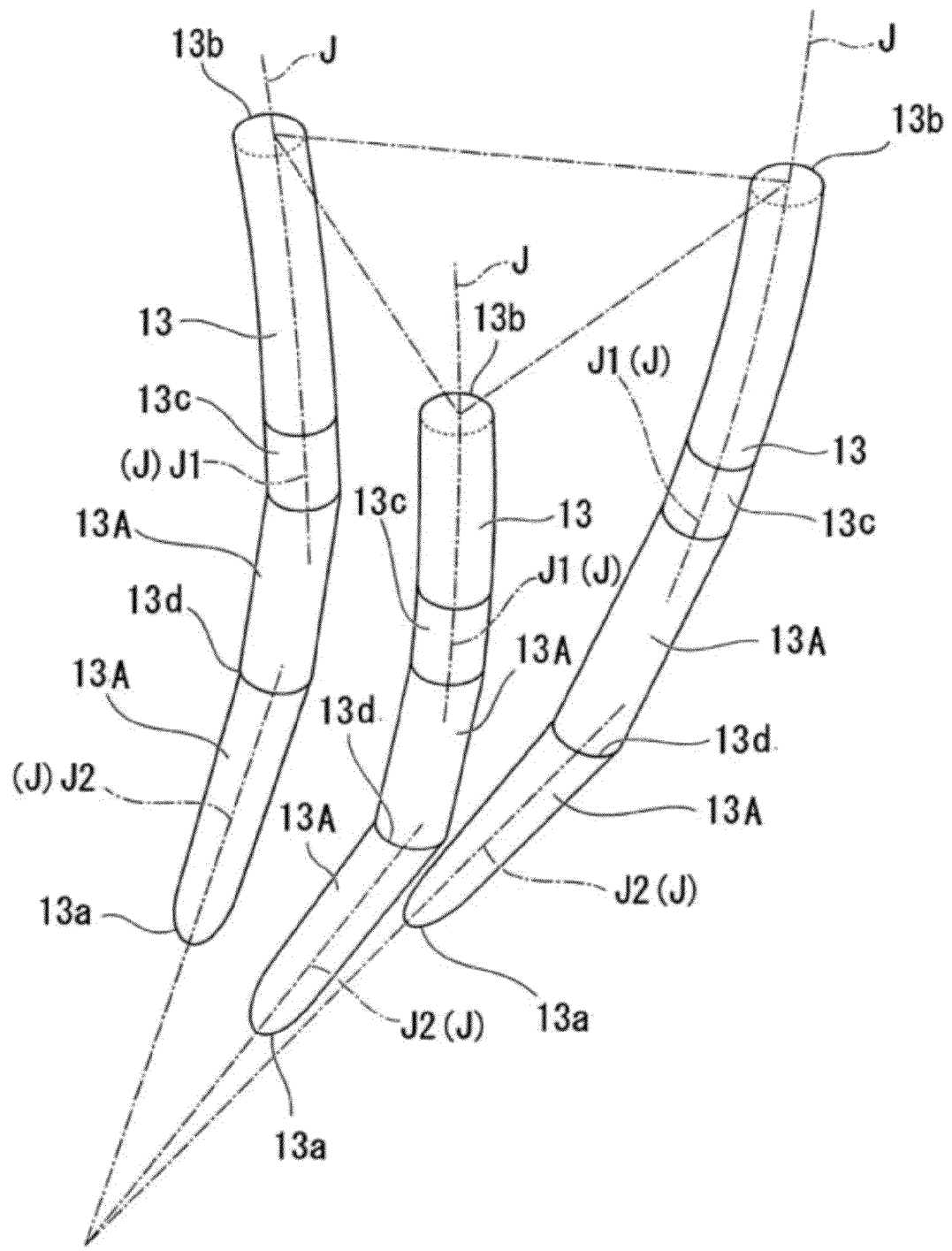
FIG. 3 is a perspective view illustrating a detailed configuration of another example of the carbon electrodes of FIG. 2.

The bent portion 13A of the carbon electrode 13 may have a vertex 13d with a sharp bent as shown in FIG. 3. The number of the vertexes may be one or two or more. The length from the tip end 13a to the vertex 13d is, for example, 100 to 1100 mm. The length is, for example, 100, 200, 300, 400, 500, 600, 700, 800, 900, 1000, 1100 mm, and it can be in the range between two values of the values exemplified here. This length means a length to the vertex closest to the other end 13b when the number of the vertexes is plural.

Furthermore, in the present embodiment, the other ends 13b of the electrodes 13 may be configured to form a substantially triangle shape. Furthermore, the other ends 13b of the electrodes 13 may be configured to form a polygonal shape. The polygonal shape may be tetragonal shape, hexagonal shape, octagonal shape, nonagonal shape, dodecagonal shape, pentadecagonal shape, hexadecagonal shape, and the number of the carbon electrodes corresponds to the polygonal shape.

The electrode configuration may be either of (2-phase alternative current, 4 electrodes), (2-phase alternative current, 6 electrodes), (2-phase alternative current, 8 electrodes), (2-phase alternative current, 10 electrodes), (3-phase alternative current, 3 electrodes), (3-phase alternative current, 6 electrodes), (3-phase alternative current, 9 electrodes), (3-phase alternative current, 12 electrodes), (3-phase alternative current, 15 electrodes), (4-phase alternative current, 4 electrodes), (4-phase alternative current, 8 electrodes), (4-phase alternative current, 12 electrodes), or (4-phase alternative current, 16 electrodes). In addition, the adjacent electrodes are arranged ring-like so that the absolute value of the phase difference θ of the alternating current becomes 90 to 180 degrees. The number of electrodes, a position, and a power supply method are not limited to the above configuration, but other configurations may be employed.

As an example of the electrode configuration (electrode position relationship), the configuration of (3-phase alternative current, 6 electrodes) will be explained.

In this example, six electrodes are powered by three-phase alternative current, and the portions corresponding to the other end 13b of the carbon electrodes 13 are placed to form a substantially hexagonal shape of, for example, E1, E2, E3, E4, E5, E6 in a plan view. In this (3-phase, 6 electrodes) configuration, the electrodes are placed so that distances between the tip ends of the adjacent electrodes are equal, and forms a hexagonal ring connecting the tip ends of the electrodes.

Differences in phase between the adjacent electrodes are 120 degrees for three-phase alternative current. So, the electrodes facing each other across the ring center are in-phase. Specifically, when the electrode E1 is in R phase for three-phase alternative current, the electrode E4 facing electrode E1 across the ring center is also in R phase. Furthermore, the electrode E2 is in T phase, the electrode E6 is in S phase, the electrode E3 is in S phase, and the electrode E5 is in T phase. Therefore, a pair of the electrode E1 and the electrode E4, a pair of the electrode E2 and the electrode E5, a pair of the electrode E3 and the electrode E6 are each in phase, and other pairs of electrodes are in different phases.

In this electrode configuration, the electrodes E2 and E6 are in difference phase with respect to the electrode E1, and thus stable arc is formed between the electrode E1 and the adjacent electrodes, and thus ring-shaped arc connecting the adjacent electrodes along the inner surface of the crucible is formed. On the contrary, the electrodes E1 and the electrode E4 are in-phase, and thus arc crossing the ring center is not formed and excessive heating at the crucible center can be avoided.

Furthermore, according to the above-mentioned electrode configuration, because arc is formed between adjacent electrodes, the arc is unlikely to be stopped and stable arc can be maintained even when interelectrode distances are enlarged to enlarge a heating range. In the present invention, the ring-shaped arc includes not only arc formed by the electrodes protruding into a crucible inside, but also arc formed concentrically with a crucible inner surface by the electrodes placed above the crucible opening.

The carbon electrodes 13 may be made of highly-pure carbon particles with a particle diameter of 0.3 mm or less, preferably 0.1 mm or less, more preferably 0.05 mm or less. When the density is 1.30 g/cm$^3$ to 1.80 g/cm$^3$ or 1.30 g/cm$^3$ to 1.70 g/cm$^3$, the difference in density between the carbon electrodes 13 may be made 0.2 g/cm$^3$ or less, and thus the carbon electrodes 13 can be made highly uniform.

The above-mentioned carbon electrode 13 having a bent portion 13A can be manufactured, for example, by the following method.

First, as a material for the carbon electrode 13, a mixture obtained by carbonizing particles such as coke, for example, pitch coke made from coal, and a binder such as coal tar pitch, for example, made from coal can be employed. Thereafter, such material is subjected to extrusion, CIP molding, or the like to obtain a carbon electrode having a general cylindrical shape with a tip portion tapered toward the tip end.

For example, the method of manufacturing a carbon electrode by extrusion can be performed by the processes of: heating and mixing a carbon raw material and a binder which are adjusted to provide a desired particle diameter, extruding the obtained mixture, followed by firing and graphitizing at 2600 to 3100 degrees C. to obtain a graphite material. Thereafter, the graphite material is subjected to machining, and thereafter subjected to purification process at 2000 degrees C. or more by use of a halogen gas such as chlorine.

Furthermore, the method of manufacturing a carbon electrode by CIP molding can be performed by the processes of: pulverizing a mixture obtained by heating and mixing a carbon raw material and a binder which are adjusted to provide a desired particle diameter, followed by sieving, and subjecting the sieved secondary particles to CIP molding. Then, the molded body is fired, and graphitized at 2600 to 3100 degrees C. to obtain a graphite material. The graphite material is subjected to machining, and thereafter subjected to purification process at 2000 degrees C. or more by use of a halogen gas such as chlorine.

1-3. Position Displacement Control Unit 35

The apparatus 1 includes a position displacement control unit 35 for enabling displacement of at least one of the relative position state of the mold 10 and the electrodes 13, the position state of the mold 10, and the position state of the electrodes 13. The position displacement control unit 35 performs at least one position displacement control among the horizontal direction movement, tilt, rotation or pivot of the mold 10, or the movement of the vertical relative position between the electrodes 13 and the mold 10.

The position displacement control unit 35 includes, for example, an arithmetic processing unit such as a CPU, and is connected to a temperature detector and the like to detect various properties during manufacturing such as the fused state of the silica powder layer 11 in the mold 10, an electrode position setting unit 20 for setting the position of the carbon electrodes 13, and a mold position setting unit 21 for setting the mold position. The position displacement control unit 35 performs position displacement control of the mold 10 and the carbon electrodes 13 by controlling the electrode position setting unit 20 and the mold position setting unit 21 based on the detection result from the temperature detector and the like.

Based on the position displacement control, it is possible to displace the position, to which the arc flame is thrown, in the inner surface of the mold 10, and control the fused state of vitreous silica. Furthermore, the position displacement control unit 35 may be connected to the power-supply unit 40, and may control power supplied to the carbon electrodes 13 from the power-supply unit 40 based on the detection result from the temperature detector and the like.

1-3-1. Electrode Position Setting Unit 20

The carbon electrodes 13 shown in FIGS. 1 and 2 are vertically movable in a direction of an arrow T by an electrode position setting unit 20 connected to the position displacement control unit 35, and thus the height direction position H of the carbon electrodes 13 is adjustable. Furthermore, horizontal distances D are adjustable by the electrode position setting unit 20, and thus the relative positions other than a height between the carbon electrodes 13 and the mold 10 are also adjustable by the electrode position setting unit 20. The electrode position setting unit 20 and the power-supply unit 40 are each connected to the position displacement control unit 35.

As shown in FIG. 1, the electrode position setting unit 20 includes a supporting unit (not shown), a horizontal movement unit, and a vertical movement unit. The supporting unit(s) supports the carbon electrodes 13 so that the horizontal distances D are adjustable. The horizontal movement unit enables horizontal movement of the supporting unit. The vertical movement unit enables vertical movement of the supporting units and the horizontal movement units together.

In the supporting unit, the carbon electrode 13 is rotatably supported around an angle setting axis (not shown), and is configured to be capable of uniformly applying arc discharge to the whole area of the bottom inner surface 11a and the sidewall inner surface 11b of the silica powder layer 11 supplied in the mold 10 while rotating or pivoting the carbon electrode 13. Furthermore, the electrode position setting unit 20 can control the height position H of the electrode tip ends 13a of the carbon electrodes 13 with respect to the upper end position (opening 10A of the mold 10) of the silica powder layer 11 by controlling the height position of the supporting unit by the vertical movement unit.

1-3-2. Mold Position Setting Unit 21

Figure 4:
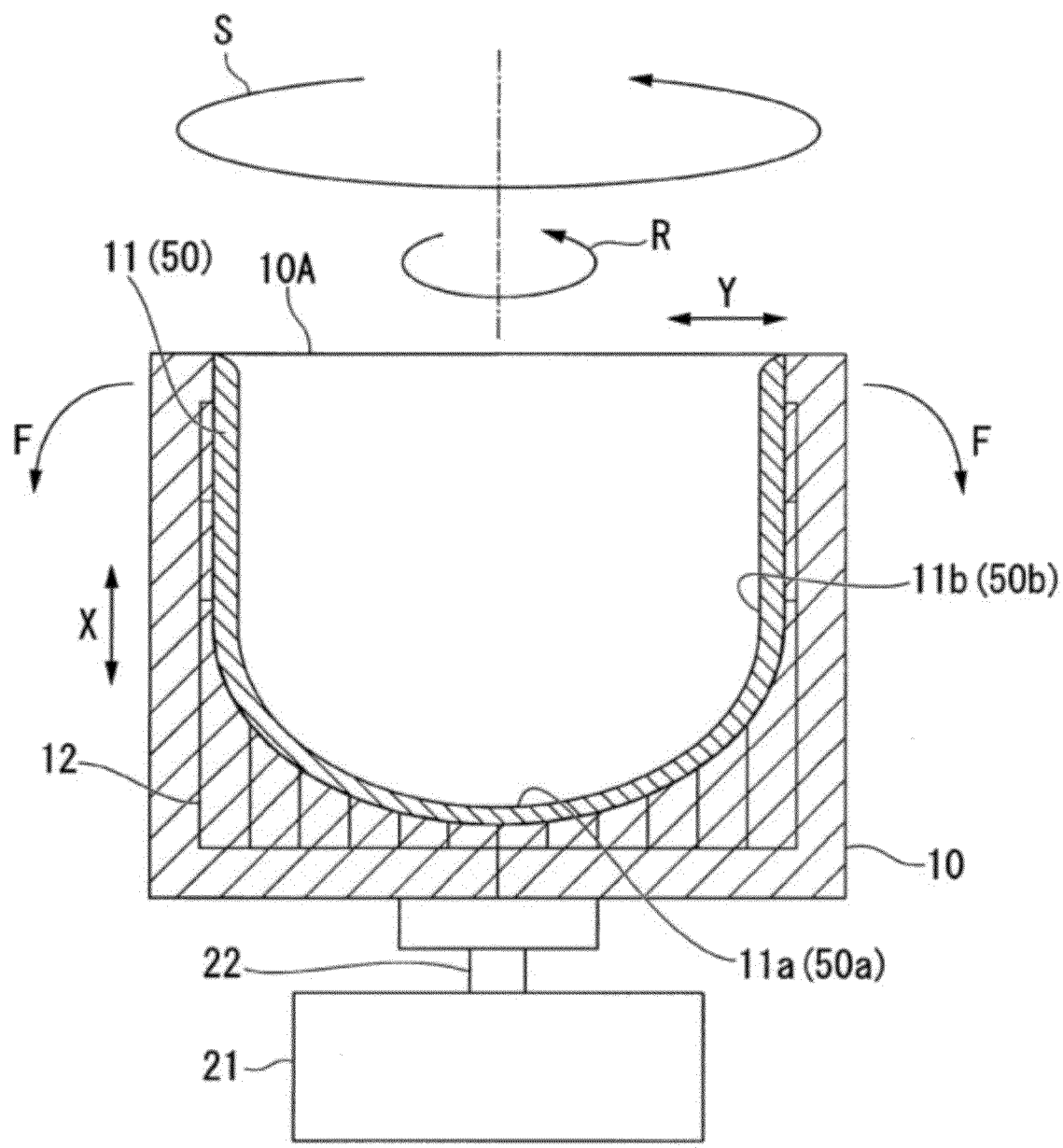
FIG. 4 is a front view illustrating a detailed configuration of the mold of FIG. 1.

Next, by use of FIG. 4, the mold position setting unit 21 will be explained. FIG. 4 is a front view illustrating the mold 10 and the mold position setting unit 21 of the apparatus for manufacturing a vitreous silica crucible according to the present embodiment.

The mold 10 is configured to be horizontally moved (arrow Y direction), tilted (arrow F direction), rotated (arrow R direction), or pivoted (arrow S direction) by a mold position setting unit 21 connected to the position displacement control unit 35 via an operation axis 22. Furthermore, the apparatus 1 is configured to be capable of moving a relative vertical position of the carbon electrodes 13 (See FIGS. 1 and 2) and the mold 10, as shown with an arrow X in FIG. 4.

The mold position setting unit 21 can move the mold 10 in various directions mentioned above under the control based on the detection result of the above-mentioned temperature detector and the like.

As shown in FIGS. 1 and 4, the mold position setting unit 21 moves the mold 10 in various directions via the operation axis 22. The mold position setting unit 21, though the details are not shown, includes a motor, a cam mechanism, and a lifting and lowering device etc. to move the operation axis 22 and the mold 10 in a desired direction.

By manufacturing a vitreous silica crucible 50 by use of the apparatus 1 of the present embodiment, it is possible to prevent deterioration of the inner surface property, in particular, of the sidewall inner surface 50b, and thus it is possible to control the material fused state and the inner surface state. Therefore, it is possible to enable stable quality control by reducing variation of the product property, and thus manufacture a vitreous silica crucible 50 having a good inner surface property.

2. Method of Manufacturing Vitreous Silica Crucible

Next, a method of manufacturing a vitreous silica crucible by use of the apparatus 1 will be explained with reference to drawings.

The method of manufacturing a vitreous silica crucible of the present embodiment includes: a silica powder supplying process for supplying silica powder inside the mold 10 to form a silica powder layer 11, and an arc fusing process for fusing the silica powder layer 11 by arc discharge generated by the carbon electrodes 13, wherein, in the arc fusing process, the silica powder layer 11 is fused by performing arc discharge toward the silica powder layer 11 from respective tip ends 13a of the carbon electrodes 13.

Figure 5:
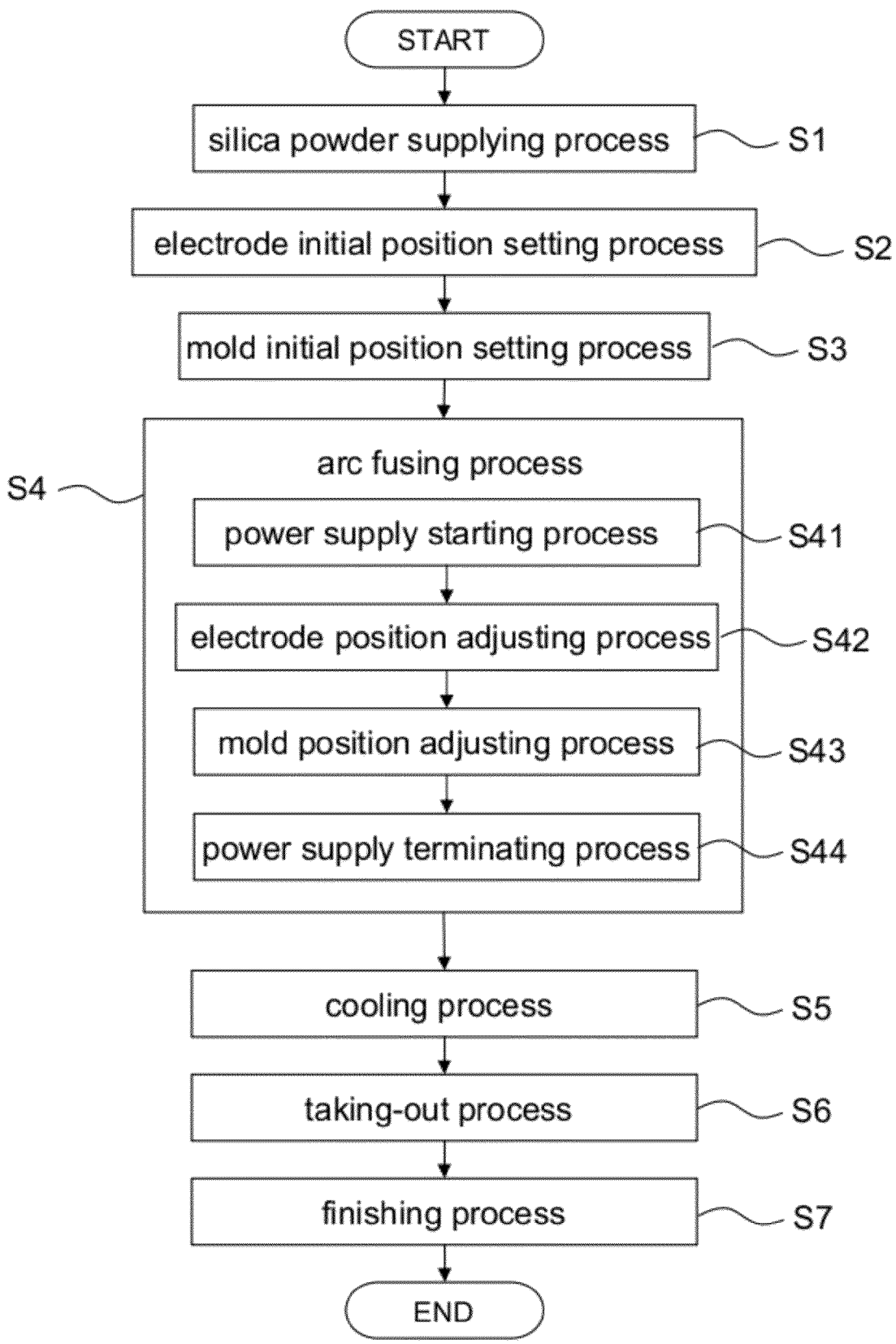
FIG. 5 is a flowchart illustrating processes of an embodiment of a method of manufacturing a vitreous silica crucible of the present invention.

FIG. 5 is a flowchart illustrating a method of manufacturing a vitreous silica crucible of the present embodiment.

The method of the present embodiment is the rotating mold method using the apparatus 1 shown in FIG. 1. As shown in FIG. 4, the method includes a silica powder supplying process S1, an electrode initial position setting process S2, a mold initial position setting process S3, an arc fusing process S4, a cooling process S5, a taking-out process S6, a finishing process S7.

In the silica powder supplying process S1, silica powder is deposited on an inner surface of the mold 10 to form a silica powder layer 11 in a desired shape, that is, a crucible shape. This silica powder layer 11 is retained onto the inner wall surface of the mold 10 by a centrifugal force due to rotation of the mold 10.

Next, in the electrode initial position setting process S2, as shown in FIGS. 1 and 2, initial positions of the carbon electrodes 13 are set by the electrode position setting unit 20 so that the tip ends 13a of the electrodes 13 has an apex toward the mold 10, each axis line J maintains an appropriate angle, and the tip ends 13a of the carbon electrodes 13 contact one another.

In addition, an initial state of a mold-electrode relative position can be set by setting the electrode height position H which is a height dimension from the edge of the mold 10 to the electrode tip ends, or the position in the horizontal direction D.

Next, in the mold initial position setting process S3, as shown in FIGS. 1 and 4, an initial state of the mold 10 is set by the mold position setting unit 21 so that the mold 10 is vertically placed with the opening 10A directed upwardly.

Next, in the arc fusing process S4, the silica powder layer 11 is fused to form a vitreous silica layer by adjusting positions of the electrodes 13 to heat the retained silica powder layer 11 with an arc discharge unit while depressurizing the mold 10 and the silica powder layer 11 through ventilation holes 12.

The arc fusing process S4 of the present embodiment include sub-processes of a power supply starting process S41, an electrode position adjusting process S42, a mold position adjusting process S43, and a power supply terminating process S44. Here, in the power supply starting process S41, powder is supplied to the carbon electrodes 13 in a predetermined amount from the power-supply unit 40. Arc discharge is not yet generated in this state.

In the electrode position adjusting process S42, the distances between the tip ends 13a are enlarged by the electrode position setting unit 20 in a state that the tip ends 13a has an apex toward the mold 10. Then, arc discharge starts to be generated between the carbon electrodes 13. Supplied power to each of the carbon electrodes 13 is controlled to be a power density of, for example, 40 kVA/cm$^2$ to 1700 kVA/cm$^2$ by the power-supply unit 40. Furthermore, the mold-electrode relative position, such as the electrode height position H, is set to satisfy conditions to be a heat source necessary for fusing of the silica powder layer 11 while maintaining the angles of θ by the electrode position setting unit 20.

A power density explained in the present embodiment means the amount of supplied power per unit cross-sectional area of a cross section orthogonally crossing an electrode central axis. Specifically, the power density is measured in a position approximately 15 to 25 mm, preferably 20 mm from the electrode tip end in a length of the axis direction. The power density is expressed in a formula {supplied power amount (kVA)/electrode cross-section area ($cm^2$)}. The supplied power amount is a power supplied to one electrode, and the electrode cross-section area is an electrode cross-section area of a cross section crossing orthogonally an electrode central axis. More specifically, an electrode diameter in the 20 mm position is preferably 20 to 40 mm, more preferably 25 to 35 mm, most preferably 30 mm.

In the mold position adjusting process S43, the operation of the mold position setting unit 21 and the electrode position setting unit 20 are controlled based on the above-mentioned temperature detector and the like and settings by an input unit (not shown). In the present embodiment, the position displacement control unit 35 displaces at least one of the relative position state of the mold 10 and the electrodes 13, the position state of the mold 10, and the position state of the electrodes 13 based on the above-mentioned detection signal or setting signal, to uniformly apply the arc to the entire area of the bottom inner surface 11a and the sidewall inner surface 11b of the fused silica powder layer 11.

This enables that bubbles or the like generated in the silica powder layer 11 are effectively removed by the action of fire polishing, and a vitreous silica crucible 50 is manufactured while controlling the inner surface property to be an appropriate state and controlling the fused state of the vitreous silica in the mold 10. Furthermore, the position displacement control unit 35 enables that the vitreous silica crucible 50 is manufactured while controlling the power supplied to the carbon electrodes 13.

Furthermore, in the mold position adjusting process S43, it is preferred that the mold 10 is horizontally moved (arrow Y direction), tilted (arrow F direction), rotated (arrow R direction), or pivoted (arrow S direction), or the relative vertical position of the carbon electrodes 13 (See FIGS. 1 and 2) and the mold 10 is moved as shown with an arrow X, as shown in FIG. 4, based on the above-mentioned temperature detector and the like and various settings by an input unit (not shown).

According to this, the bubbles or the like generated in the fusing material during fusing the silica powder layer 11 supplied in the mold 10 can be more certainly removed, and thus a vitreous silica crucible 50 can be manufactured while controlling the inner surface property, in particular, on the sidewall inner surface 50 to be excellent.

Next, in the power supply terminating process S44, power supply by the power-supply unit 40 is terminated when the silica powder layer 11 is fused to be a predetermined state.

In the arc fusing process S4, the silica powder layer 11 made of silica powder is fused to form a vitreous silica layer 51.

Next, in the cooling process S5, after power supply to the electrodes 13 is terminated, the vitreous silica layer 51 is cooled to produce a vitreous silica crucible 50.

Next, in the taking-out process S6, a semimanufactured crucible 52 is taken out of the mold 10.

Thereafter, in the finishing process S7, a honing process to jet high-pressure water to a crucible outer face, a rim cut process to adjust a crucible height dimension to a predetermined state, and a washing process to wash a crucible inner surface by an HF process etc. are performed to manufacture a vitreous silica crucible 50.

In the present embodiment, in the above-mentioned arc fusing process S4, the silica powder layer 11 in the mold 10 is fused by use of carbon electrodes 13 each having a bent portion 13A. During this, arc discharge is performed by use of the above-configured carbon electrodes 13, and thus it is possible to perform arc discharge while placing the tip ends 13a having relatively high temperature close to the sidewall inner surface 11b, and thus it is possible to manufacture a vitreous silica crucible 50 having a good inner surface property. Furthermore, it is possible to uniformly applying the arc toward the entire area of the inner surface, in particular, the sidewall inner surface 11b of the fused silica powder layer 11 by displacing the position of the above-mentioned carbon electrodes 13 (and the mold 10), and thus it is possible to remove the bubbles or the like generated in the silica powder layer 11 more certainly.

Here, it is possible to use a bubble content rate per unit area from the surface to a predetermined depth as an indicator representing the surface property of the bottom inner surface 50a, the sidewall inner surface 50b, or the like of the vitreous silica crucible 50. In this case, for example, first, the bubble content rates of a transparent inner layer and an opaque outer layer are determined by specific gravity measurement, and thereafter, the surfaces of the sidewall inner surface and the bottom inner surface are photographed by use of an optical microscope, and the bubble content rate in the transparent layer can be determined by use of the photographs of the optical microscope. Here, the bubble content rate as explained in the present embodiment is a ratio of volume occupied by bubbles having a diameter of 0.05 mm or more existing in a depth of 0 mm to 0.5 mm in an area of 4 mm×4 mm in the sidewall inner surface and the bottom inner surface of the vitreous silica crucible.

When a silicon single crystal is pulled by use of a vitreous silica crucible 50 obtained by the present embodiment to manufacture a silicon single crystal ingot, it is possible to suppress crystal defects and obtain a silicon single crystal which is excellent in the crystallinity.

Example

Hereinafter, with reference to Examples, the apparatus and the method for manufacturing a vitreous silica crucible of the present invention will be explained in detail, but the present invention is not limited to the Examples.

In each of the following Examples and Comparative examples, a vitreous silica crucible was manufactured by the rotating mold method under the conditions described below. The mold had an opening diameter of 868.8 mm (34.2 inches), and an average thickness of a silica powder layer deposited on the mold inner surface was 28 mm to manufacture a vitreous silica crucible with an opening diameter of 812.8 mm (32 inches). The electrodes were powered for 60 minutes to fuse the silica powder layer, and vacuum suction of the silica powder layer was conducted for 60 minutes from the beginning.

Examples 1 to 6

The silica powder layer deposited on the mold inner surface was subjected to arc fusing to be vitrified under the conditions shown in Table 1, and by use of carbon electrodes each having a bent portion, and in a state that those carbon electrodes were arranged so that the tip ends form an apex toward the mold. In this occasion, the conditions for arc discharge were as shown in Table 1. Thus, vitreous silica crucibles of Examples 1 to 6 were manufactured.

Thereafter, the bubble content rates in the inner surface, that is, the sidewall inner surface and the bottom inner surface of the manufactured vitreous silica crucible were measured in the following way.

First, the bubble content rates of an inner layer (transparent layer) and an outer layer (opaque layer) were determined by specific gravity measurement. Thereafter, the surfaces of the sidewall inner surface and the bottom inner surface were photographed by use of an optical microscope, and the bubble content rate in the transparent layer were determined by use of the photographs of the optical microscope. The results are shown in Table 2.

Here, the bubble content rate as explained in the present Example is a ratio of volume occupied by bubbles having a diameter of 0.05 mm or more existing in a depth of 0 mm to 0.5 mm in an area of 4 mm×4 mm in the sidewall inner surface and the bottom inner surface of the vitreous silica crucible.
(1) A (Excellent): The bubble content rate of the average diameter of 50 μm or more was less than 0.2%, which was very low.
(2) B (Good): The bubble content rate of the average diameter of 50 μm or more was 0.2% or more and less than 0.4%, which was acceptable.
(3) C (NG): The bubble content rate of the average diameter of 50 μm or more was 0.4% or more, which was very high.

Furthermore, a silicon single crystal ingot was pulled by use of the manufactured vitreous silica crucible, and the single crystallization yield of the pulled ingot was investigated, and judged under the following criteria. The results are shown in Table 2.
(1) A (Excellent): The single crystallization yield was more than 70%, and thus the crystal property was excellent.
(2) B (Good): The single crystallization yield was 50 to 70%, and thus the crystal property was acceptable.
(3) C (NG): The single crystallization yield was less than 50% and thus there were many crystal defects.

Comparative Examples 1 to 3

Vitreous silica crucible of Comparative Examples 1 to 3 were manufactured in the same procedures as in Examples 1 to 6 except that arc discharge to the silica powder layer formed in the mold was performed by use of an apparatus having conventional linear electrodes.

Then, the bubble content rates of the sidewall inner surface and the bottom inner surface of the vitreous silica crucible was measured according to the same procedures as in Examples 1 to 6, and they were judged under the above-mentioned criteria. The results are shown in Table 2.

Furthermore, as in Examples 1 to 6, a silicon single crystal ingot was pulled by use of the manufactured vitreous silica crucible, and the single crystallization yield of the pulled ingot was investigated. The results are shown in Table 2.

The conditions for manufacturing a vitreous silica crucible in above-mentioned Examples and Comparative Examples are listed in Table 1, and the evaluation results are listed in Table 2.

For all rows in Table 1, the number of the electrodes is 3, and the shape of the tip end is a circular truncated cone, and the diameter of the electrode is 50 mm. In addition, for all rows in Table 1, the arc discharge output is 3000 kVA, and the powered time is 60 minutes. In Table 1, R1, R2, and R3 are the radius of curvature for Electrode 1, Electrode 2, and Electrode 3, respectively. Furthermore, "Length of Bent Portion" in Table 1 means the length of the curved portion from the tip end to the base portion for Examples 1 to 3, and the length from the tip end to the vertex for Examples 4 to 6. Furthermore, "Power Density" in Table 1 means the power density in each carbon electrode.

TABLE 1

| | Carbon Electrode | | | | Arc Discharge Conditions |
|---|---|---|---|---|---|
| Shape of Electrode | Radius of Curvature R (mm) | | | Length of Bent Portion (mm) | Power Density (kVA/cm$^2$) |
| | R1 | R2 | R3 | | |
| Ex. 1 | One Curved Portion | 500 | 500 | 500 | 350 | 600 |
| Ex. 2 | One Curved Portion | 1450 | 1450 | 1200 | 600 | 200 |
| Ex. 3 | One Curved Portion | 800 | 900 | 1000 | 425 | 400 |
| | Angle between Tip End and Base Portion | | | | |
| Ex. 4 | One Vertex | 150 | 150 | 150 | 350 | 200 |
| Ex. 5 | One Vertex | 100 | 100 | 120 | 600 | 800 |
| Ex. 6 | One Vertex | 120 | 130 | 135 | 425 | 600 |
| Comp. Ex. 1 | Linear | — | — | — | | 600 |
| Comp. Ex. 2 | Linear | — | — | — | | 200 |
| Comp. Ex. 3 | Linear | — | — | — | | 400 |

TABLE 2

| | Evaluation of Surface Property | | | | Evaluation of Single Crystal Pulling Property | |
|---|---|---|---|---|---|---|
| | Bubble Content Rate (%) | | Evaluation | | Single Crystalli- | |
| | Bottom Inner Surface | Sidewall Inner Surface | Bottom Inner Surface | Sidewall Inner Surface | zation Yield (%) | Evaluation |
| Ex. 1 | 0.11 | 0.16 | A | A | 80 | A |
| Ex. 2 | 0.09 | 0.11 | A | A | 80 | A |
| Ex. 3 | 0.09 | 0.21 | A | B | 75 | A |
| Ex. 4 | 0.10 | 0.16 | A | A | 80 | A |
| Ex. 5 | 0.11 | 0.15 | A | A | 80 | A |
| Ex. 6 | 0.09 | 0.20 | A | A | 75 | A |
| Comp. Ex. 1 | 0.08 | 0.42 | A | C | 35 | C |
| Comp. Ex. 2 | 0.11 | 0.55 | A | C | 41 | C |
| Comp. Ex. 3 | 0.22 | 0.47 | B | C | 10 | C |

Figure 6:
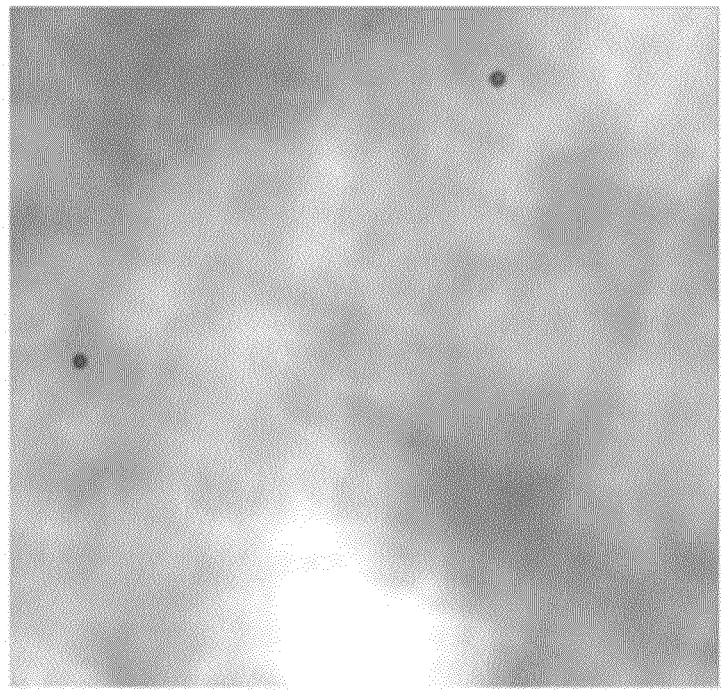
FIG. 6 is a photograph illustrating bubble distribution in the inner surface of a vitreous silica crucible according to the example of the present invention.

As shown in Table 2, as to the vitreous silica crucibles of Examples 1 to 6 manufactured by use of the apparatus and the method according to the present invention, the bubble content rate in either of the bottom inner surface and the sidewall inner surface was low and the evaluations of the surface property were all "A" or "B" (See microphotograph in FIG. 6). According to this, it was confirmed that the properties of the sidewall inner surface as well as the bottom inner surface were excellent in the vitreous silica crucible obtained by the apparatus and the method of the present invention.

Furthermore, when a silicon single crystal was pulled by use of the vitreous silica crucible obtained by the apparatus and the method of the present invention, as shown in Table 2, the single crystallization yield was 75 to 80%, and the evaluations of the silicon single crystal pulling property were all "A", and thus it was confirmed that a silicon single crystal having an excellent property without crystal defects can be obtained.

Figure 7:
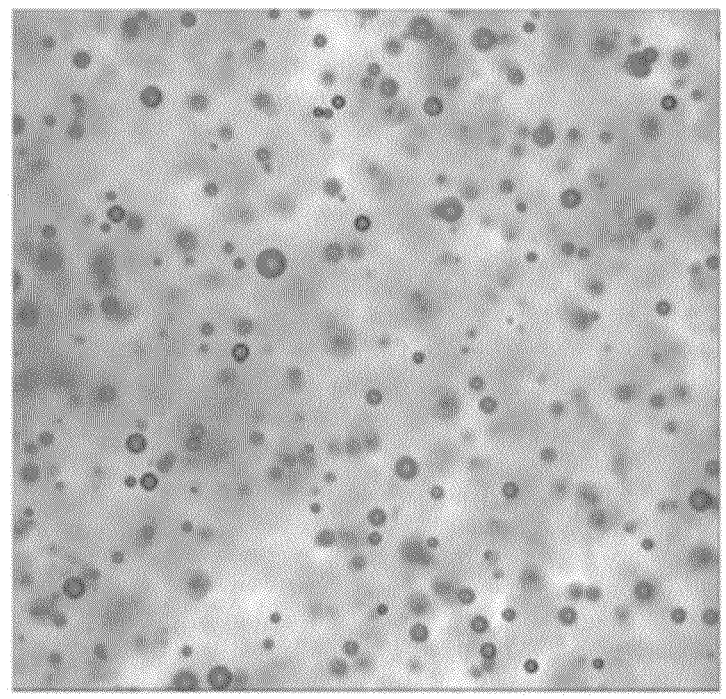
FIG. 7 is a photograph illustrating bubble distribution in the inner surface of a conventional vitreous silica crucible.
Figure 8:
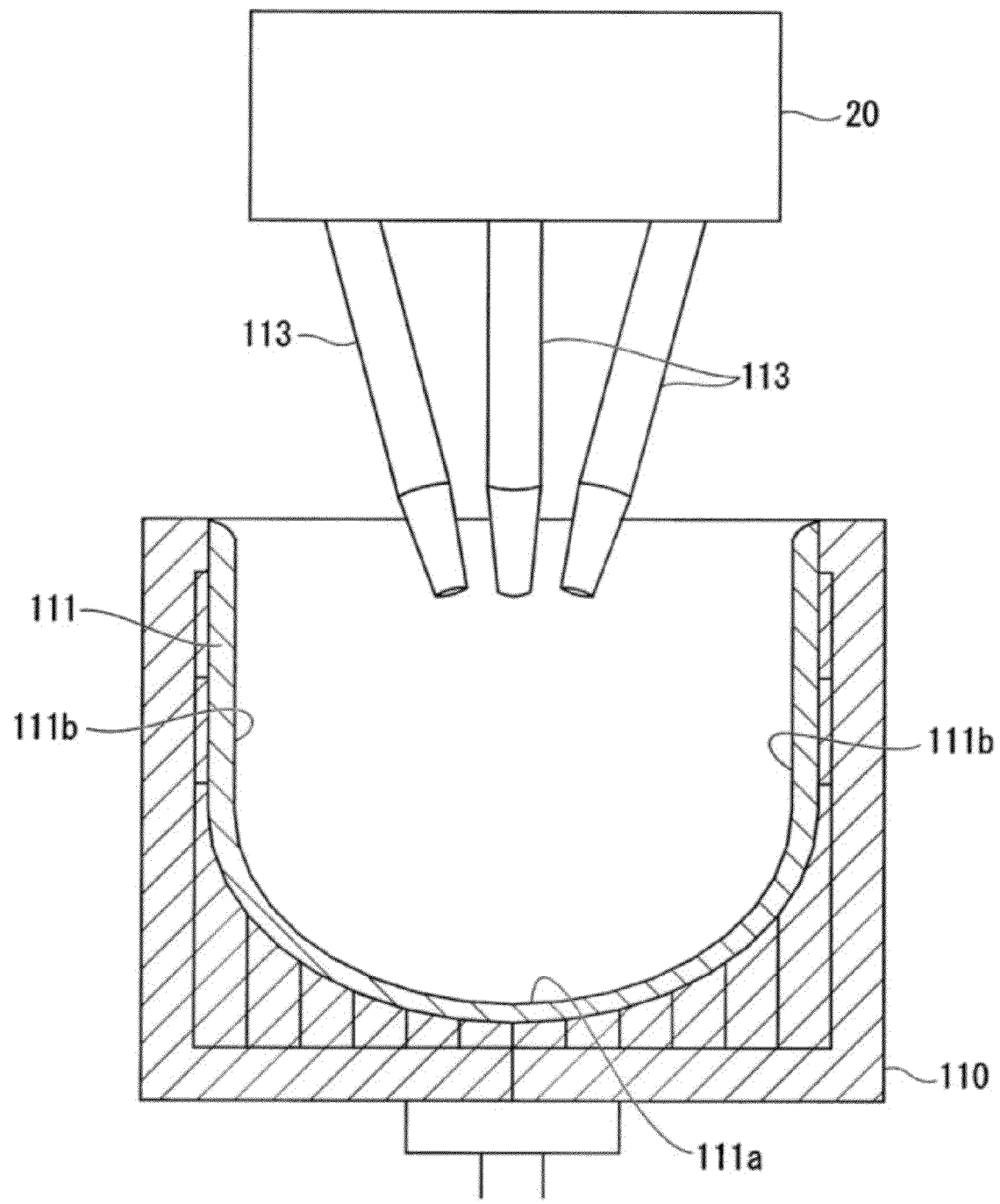
FIG. 8 is a front view illustrating a conventional apparatus for manufacturing a vitreous silica crucible.

In contrast, as to the vitreous silica crucible of Comparative Examples 1 to 3 manufactured by use of a conventional apparatus and method, as shown in Table 2, the bubble content rate in the bottom inner surface was generally low and thus good, but he bubble distribution on the sidewall inner surface was very high, and thus the evaluations of the surface property for the sidewall inner surface was all "C" (See microphotograph in FIG. 7). Thus, it can be seen that the vitreous silica crucibles of Comparative Examples 1 to 3 were inferior, in particular, in the property of the sidewall inner surface.

Furthermore, when a silicon single crystal was pulled by use of the vitreous silica crucible of Comparative Examples 1 to 3, as shown in Table 2, the single crystallization yield was 10 to 41%, and the evaluations of the silicon single crystal pulling property were all "C", and thus it was confirmed that a silicon single crystal with defects can be obtained.

According to the results in Examples, it is apparent that, according to the apparatus and the method for manufacturing a vitreous silica crucible of the present invention, it is possible to certainly remove bubbles or the like generated in the fusing material by fire polishing, and thus it is possible to manufacture a vitreous silica crucible having a good inner surface property, in particular, on the sidewall.

In addition, when a silicon single crystal is pulled by use of such a vitreous silica crucible, it is apparent that it is possible to suppress crystal defects and obtain a silicon single crystal which is excellent in the crystallinity.

EXPLANATION OF REFERENCE SYMBOL

1: Apparatus for Manufacturing Vitreous Silica Crucible
10: Mold
11: Silica Powder Layer
11a: Bottom Inner Surface of Silica Powder Layer
11b: Sidewall Inner Surface of Silica Powder Layer
13: Carbon Electrode
13A: Bent Portion
13a: Tip End
13c: Base Portion
40: Power-Supply Unit
35: Control Unit
50: Vitreous Silica Crucible
50a: Bottom Inner Surface of Vitreous Silica Crucible
50b: Sidewall Inner Surface of Vitreous Silica Crucible
J (J1, J2): Axis Line
R (R1, R2, R3): Radius of Curvature

The invention claimed is:

1. An apparatus for manufacturing a vitreous silica crucible, comprising a mold defining an outer shape of a vitreous silica crucible, a position displacement control unit for enabling displacement of the position state of the mold, and an arc discharge unit having electrodes and a power-supply unit, wherein
each of the electrodes includes a tip end directed to the mold, the other end opposite to the tip end, and a bent portion provided between the tip end and the other end so that an axis line at the other end and an axis line at the tip end do not overlap.

2. The apparatus of claim 1, wherein an angle between the axis line at the tip end and the axis line at the other end is 90 to 175 degrees.

3. The apparatus of claim 2, wherein the angle is 90 to 150 degrees.

4. The apparatus of claim 1, wherein the bent portion has a radius of curvature of 450 to 1500 mm.

5. The apparatus of claim 4, wherein the bent portion has a length of 100 to 1100 mm.

6. The apparatus of claim 1, wherein the electrodes are arranged so that the tip ends of the electrodes form a substantially polygonal shape.

7. The apparatus of claim 1, wherein the position displacement control unit further enables displacement of at least one of the relative position state of the mold and the electrodes, and the position state of the electrodes.

8. The apparatus of claim 7, wherein the position displacement control unit performs at least one position displacement control among the horizontal direction movement, tilt, rotation or pivot of the mold, or the movement of the vertical relative position between the electrodes and the mold.

9. A method of manufacturing a vitreous silica crucible by use of the apparatus of claim 1, comprising:
a silica powder supplying process for supplying silica powder inside the mold to form a silica powder layer, and
an arc fusing process for fusing the silica powder layer by arc discharge generated by the electrodes,
wherein, in the arc fusing process, the silica powder layer is fused by performing arc discharge toward the silica powder layer from respective tip ends of the electrodes, while displacing the position state of the mold.

10. The method of claim 9, wherein, in the arc fusing process, the silica powder layer supplied in the mold supplied in the mold is fused while displacing at least one of the relative position state of the mold and the electrodes, and the position state of the electrodes.

11. The method of claim 10, wherein, in the arc fusing process, at least one position displacement control among the horizontal direction movement, tilt, rotation or pivot of the mold, or the movement of the vertical relative position between the electrodes and the mold is performed.

* * * * *